United States Patent
Willems

(10) Patent No.: US 9,136,743 B2
(45) Date of Patent: Sep. 15, 2015

(54) ELECTRIC DAMPER

(75) Inventor: Marco Willems, Ingolstadt (DE)

(73) Assignee: AUDI AG, Ingolstadt (DE)

(*) Notice: Subject to any disclaimer, the term of this patent is extended or adjusted under 35 U.S.C. 154(b) by 227 days.

(21) Appl. No.: 13/982,202

(22) PCT Filed: Jan. 12, 2012

(86) PCT No.: PCT/EP2012/000113
§ 371 (c)(1),
(2), (4) Date: Jul. 26, 2013

(87) PCT Pub. No.: WO2012/100910
PCT Pub. Date: Aug. 2, 2012

(65) Prior Publication Data
US 2013/0320791 A1 Dec. 5, 2013

(30) Foreign Application Priority Data
Jan. 27, 2011 (DE) .................. 10 2011 009 608

(51) Int. Cl.
| H02K 7/06 | (2006.01) |
| H02K 7/116 | (2006.01) |
| B60G 13/14 | (2006.01) |
| B60G 17/08 | (2006.01) |
| F16F 15/03 | (2006.01) |

(52) U.S. Cl.
CPC .............. *H02K 7/116* (2013.01); *B60G 13/14* (2013.01); *B60G 17/08* (2013.01); *F16F 15/035* (2013.01); *B60G 2202/20* (2013.01)

(58) Field of Classification Search
USPC ......................... 310/37–38, 75 R, 3, 98–998
See application file for complete search history.

(56) References Cited

U.S. PATENT DOCUMENTS

| 1,752,844 | A | | 4/1930 | Harrison |
| 4,825,720 | A | | 5/1989 | Capdepuy |
| 5,708,314 | A | * | 1/1998 | Law .............................. 310/114 |
| 6,297,575 | B1 | * | 10/2001 | Yang ............................ 310/266 |
| 8,007,390 | B2 | * | 8/2011 | Kato ............................ 475/160 |
| 8,900,082 | B2 | * | 12/2014 | Yang ............................ 475/156 |
| 2010/0207309 | A1 | | 8/2010 | Park |

(Continued)

FOREIGN PATENT DOCUMENTS

| DE | 101 15 858 | 10/2002 |
| DE | 102009048818 | 4/2011 |

(Continued)

OTHER PUBLICATIONS

International Search Report issued by the European Patent Office in International Application PCT/EP2012/000113 on Mar. 15, 2012.

*Primary Examiner* — Thanh Lam
(74) *Attorney, Agent, or Firm* — Henry M. Feiereisen LLC

(57) ABSTRACT

Electric damper for damping the relative movement between first and second masses, comprising a generator driven by the mass movement and having a fixed stator and a rotor rotatable relative thereto, and a gear mechanism coupled to the generator, wherein at least one first gear element, directly connected to a lifting member (13) that is movable by the mass movement, is caused to rotate by the mass movement, which first gear element is dynamically coupled by direct or indirect transmission at least one further gear element, with the second gear element being dynamically coupled to the rotor (6) of the generator (2) such that the rotor (6) is caused to rotate in relation to the stator (5).

10 Claims, 2 Drawing Sheets

(56) References Cited

U.S. PATENT DOCUMENTS

2013/0049508 A1* 2/2013 Willems .................. 310/105
2013/0154277 A1* 6/2013 Willems .................. 290/1 C
2013/0154404 A1* 6/2013 Willems .................. 310/38

FOREIGN PATENT DOCUMENTS

| EP | 0 250 283 | 12/1987 |
|----|-----------|---------|
| EP | 1 935 679 | 6/2008 |
| EP | 2 062 757 | 5/2009 |

* cited by examiner

ELECTRIC DAMPER

CROSS-REFERENCES TO RELATED APPLICATIONS

This application is the U.S. National Stage of International Application No. PCT/EP2012/000113, filed Jan. 12, 2012, which designated the United States and has been published as International Publication No. WO 2012/100910 and which claims the priority of German Patent Application, Serial No. 10 2011 009 608.6, filed Jan. 27, 2011, pursuant to 35 U.S.C. 119(a)-(d).

BACKGROUND OF THE INVENTION

The invention relates to an electric damper for damping the relative movement between first and second masses, having a generator driven by the mass movement and including a fixed stator and a rotor rotatable relative thereto, and a gear mechanism coupled to the generator.

Many areas of technology require a damping of relative movements between two components of a vibratory mechanical system. An example that is by no means limiting, involves vibration damping of a motor vehicle body in the area of the suspension of the body on the chassis. For this purpose, hydraulic dampers are predominantly used. However, they are not capable to recover or render useable energy drawn from the system during damping.

For that purpose, a proposal has been made to use so-called electric dampers which operate according to the principle of magnetic induction in order to convert the mechanical energy, drawn from the system by the mass movement, to electrical energy via a generator. As a result, the mechanical energy, drawn from the system by the mass movement, can be supplied for further use. Likewise, damping can be suited in a simple manner and over a wide adjustment range to the requirements of the vibratory mechanical system by controlling the generator. An electric damper of conventional construction is known for example from DE 101 15 858 A1.

Electric dampers known in the art have, however, a relatively complex structural design.

SUMMARY OF THE INVENTION

The invention is based on the problem to provide an electric damper which is improved, especially in terms of structural design.

This problem is solved by an electric damper of the type mentioned above, which is characterized in that at least one first gear element, directly connected to a lifting member that is movable by the mass movement, is caused to rotate by the mass movement, which first gear element is dynamically coupled by direct or indirect transmission with at least one further gear element, with the second gear element being dynamically coupled to the rotor of the generator such that the rotor is caused to rotate in relation to the stator.

The electric damper according to the invention is constructed in a particularly simple way and can easily be attached, for example, to a vehicle body of a motor vehicle. The operating principle of the electric damper is based on the coupling of a generator, comprised of a stationary stator and a rotor rotatable in relation thereto, with a gear mechanism, with the output member of the gear mechanism in the form of the second gear element transmitting a rotational movement, introduced directly by the lifting element which is coupled with the first gear element operating as drive element, onto the rotor. The rotational movement introduced into the rotor via the second gear element provides the damping via the generator and the recovery or conversion of the mechanical damping energy, originally resulting from the mass movement, to the current produced on the generator side.

The two gear elements can hereby have be linked directly or indirectly. Thus, in the event that the gear mechanism is configured as gear transmission, relatively small movements of the first gear element can be converted in dependence on the transmission ratio to high rotation speeds of the second gear element and therefore of the rotor which is dynamically coupled with the second gear element. Thus, relatively small mass movements are able to realize good damping characteristics and a significant current generation.

The presence of field-generating means is known as requirement for electric generators and can be provided either on the stator or on the rotor so that current is generated either on the rotor side or on the stator side. For example, several windings can be provided as field-generating means on the stator for allowing a separate excitation, with current to be applied to the windings for producing the magnetic field. As an alternative, it is conceivable to provide several permanent magnetic elements for self-excitation. Several windings can be provided as current generating means on the rotor for guiding the generated current, i.e. current is induced on the rotor side. Current can further be tapped via the windings and fed for example to an on-board electrical system of a motor vehicle to which the electric damper is installed.

The generator has preferably a hollow-cylindrical housing, with a first housing portion receiving the rotor and the stator, and with a second housing portion connected to the gear mechanism. The generator thus involves a cylindrical unit which is especially compact in structure and requires little installation space. This has advantages especially in cases in which the electric damper is configured as shock absorber of a motor vehicle, because especially the space in the wheel well of a motor vehicle is normally dimensioned tight. The first housing portion offers essentially space for receiving the generator, the second housing portion serves predominantly for the attachment of the housing to the gear mechanism. The generator can also have in exceptional cases a shape which differs from the stated hollow-cylindrical shape. Basically, the housing is fixed, optionally via one or more interposed elastic damping elements, such as elastomer bearings or the like, thus also connected for example firmly with the body of a motor vehicle.

The stator is preferably arranged on an inner wall of the housing. The stator including its components can be distributed based on the hollow-cylindrical shape of the housing circumferentially about the inner wall of the housing. Of course, the inner wall of the housing has respective receiving means or receiving portions for the stator including the stator components. Also an at least partial integral configuration of the stator with the housing is conceivable. The housing has advantageously to the outside an essentially closed compact shape.

The rotor has advantageously a cylindrical base shape. The shape of the rotor tracks substantially the shape of the generator housing, thereby promoting the mentioned especially compact structure of the generator and also of the electric damper overall. The rotor may in exceptional cases also have different shapes that are appropriate for installation in the housing.

The housing is suitably connected on the outside with the gear mechanism via at least a bearing element, especially a rolling-contact bearing. This ensures that movements, especially rotational movements, of the gear mechanism and its components, i.e. essentially the first and second gear elements, are not transmitted to the effectively stationary housing. Various types of rolling-contact bearings may be provided as bearing elements.

A ring-shaped section, which has at least one area axially surrounding the housing and at least one area resting on the housing outer side, is preferably associated to the gear mechanism. The ring-shaped section, which for example may be configured in one piece with the fixed part of the gear mechanism, is thus provided for the attachment of the gear mechanism on the generator including the generator housing. A press fit is optionally also conceivable so that the ring-shaped section of the gear mechanism is pressed into the housing interior space. Of course, also other force-fitting and/or form-fitting, detachable or non-detachable connection possibilities are conceivable for attachment of the ring-shaped section to the generator housing.

Advantageously, the gear element has at least one axial pin which is connected in fixed rotative engagement with the rotor, especially by engaging a rotor-side axial mount. The axial pin acts like a shaft to transmit the torque applied on the second gear element to the rotor and thus to dynamically couple the gear mechanism with the rotor the axial pin may be connected detachably or non-detachably with the second gear element including the rotor-side mount especially via force-fitting and/or formfitting connections.

The principle according to the invention is compatible with different gear mechanisms, of which preferred exemplary embodiments are illustrated hereinafter.

The gear mechanism can be configured as planetary gear train with a ring gear, at least two planet wheels in mesh with the ring gear, and a sun wheel in mesh with the planet wheels, with the ring gear forming the first gear element, and with the sun wheel, which is dynamically coupled with the rotor, forming the second gear element. Accordingly, the rotational movement introduced by the lever element via the ring gear is transmitted to the sun wheel via the fixed planet wheels which mesh therewith, with the sun wheel being dynamically coupled with the rotor. Transmission ratios are implemented especially via different dimensions or number of planet wheels.

As an alternative, the gear mechanism may also be a strain wave gearing with a ring-shaped or cylinder-shaped flexible unit having an external toothing, a rigid unit forming the first gear element and having an internal toothing in mesh with the external toothing of the flexible unit, and an oval rotary element which is arranged inside the flexible unit and interacts with the flexible unit such as to deform it and which is dynamically coupled with the rotor and forms the second gear element. Strain wave gearings or harmonic drive gearing are known to be characterized by high transmission ratios, high stiffness, compact configuration and slight play.

The basic principle of a strain wave gearing includes an internally toothed rigid ring (circular spline) having an interior in which a ring-shaped externally toothed flexible unit (flex spline) is located in coaxial relationship. Arranged inside the flexible unit is, in turn, an oval rotary element (wave generator) which serves as displacement generator and deforms the flexible unit in the shape of an ellipse such that the external toothing thereof engages the internal toothing of the rigid unit, especially in the region of the great axis of the ellipse at two opposing locales. Thus, the oval rotary element can turn in relation to the flexible unit, with the tooth engagement zones revolving rotationally. The internal toothing of the rigid has typically two more teeth than the external toothing of the flexible unit. As a consequence, a rotation of the oval rotary element, for example by 90° clockwise about its rotation axis leads to a rotation of the flexible unit in counterclockwise direction by half a tooth width in relation to the rigid ring.

According to the instant damper, the movement of the lever element is transmitted directly to the rigid unit which transmits a rotational movement, translated according to the configuration of the respective external and internal toothings, to the flexible unit and thus indirectly to the oval rotary element and further to the rotor as a result of the dynamic coupling of the oval rotary element with the rotor.

In the event of a strain wave gearing, a flexible rolling-contact bearing, in particular a roller bearing or needle bearing, is preferably arranged between the first and second gear elements. As a consequence, the oval rotary element is capable to roll off especially smoothly upon the flexible unit so that friction can be significantly reduced between the two gear elements.

The gear mechanism can also be configured as cycloid gearing. The cycloid gearing includes hereby a ring-shaped or cylinder-shaped unit which is connected with a cam disk which has an edge profiled with teeth and which in turn meshes with a fixed housing part which is profiled with teeth, with the ring-shaped or cylinder-shaped unit forming the first gear element, and with the second gear element, which engages the first gear element and is dynamically coupled with the rotor, being arranged on the cam disk, preferably in bore.

Cycloid gearings also realize high transmission ratios so that even small angular rotations of the first gear element are transmitted at high ratio to the second gear element and further to the rotor. The second gear element is arranged preferably in midsection on a cam disk which is profiled on the outside in a waved manner and rotates within a fixed housing ring having corresponding counter teeth, but is radially movable therein. Coupled to the cam disk is further the first gear element, i.e. the ring-shaped or cylinder-shaped unit, which has respective coupling pins for engagement in diametrically greater bores of the cam disk so that the cam disk is able to execute radial movements when the first gear element is arranged with fixed rotation axis.

A further exemplary embodiment of a gear mechanism involves a spur gear mechanism. This includes at least two gears in mesh via outer teeth, with a first gear forming the first gear element, and a further gear, which is dynamically coupled with the first gear directly or indirectly via one or more gears disposed there between and which is dynamically coupled with the rotor, forming the second gear element. High transmission ratios can be realized in dependence on the dimensions and the number and arrangement of used gears so that spur gear mechanisms are also capable to translate small movements of the first gear element into movements of the second gear element and further to the rotor.

BRIEF DESCRIPTION OF THE DRAWING

Further advantages, features and details of the invention will become apparent from the embodiments described hereinafter and with reference to the drawings. It is shown in.

DETAILED DESCRIPTION OF PREFERRED EMBODIMENTS

Figure 1:
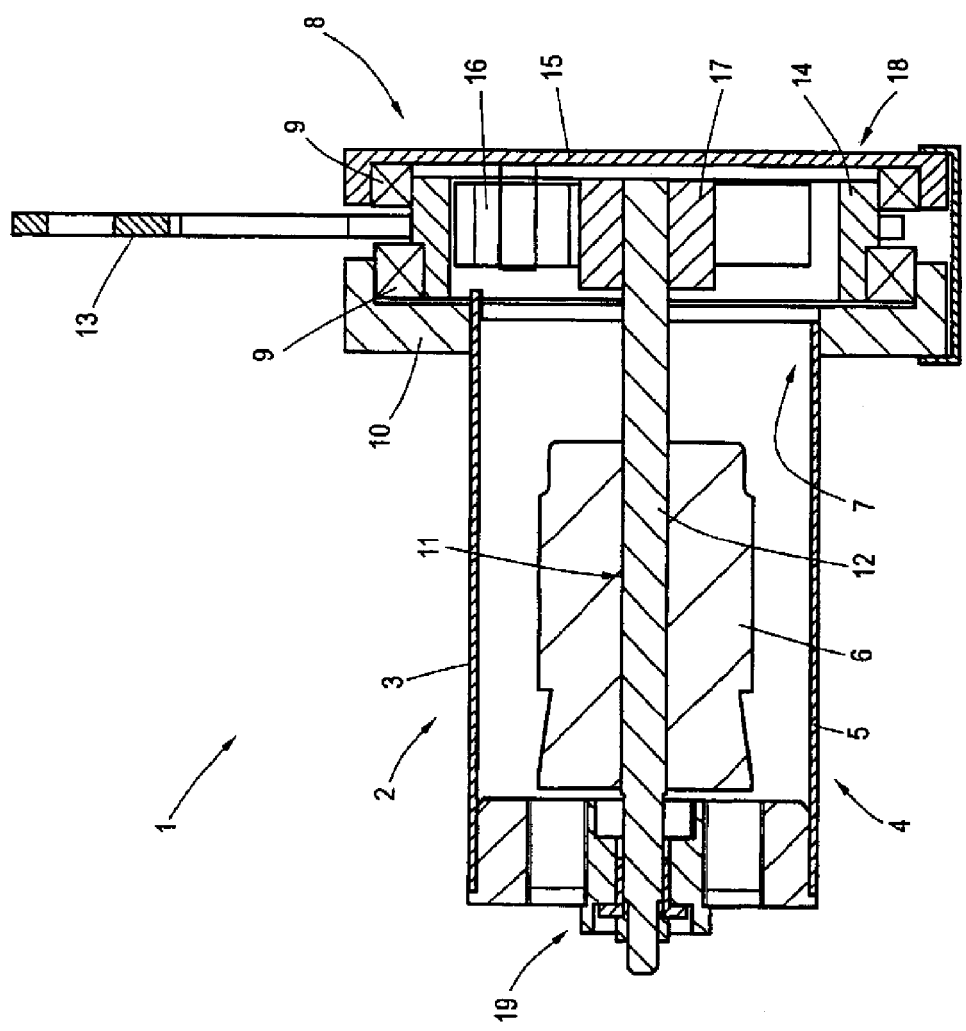
FIG. 1 a basic illustration of an exemplary embodiment of an electric damper, and FIG. 2 a basic illustration of a possible installation scenario of an electric damper in the region of a motor vehicle axis.

FIG. 1 shows a basic illustration of an electric damper 1 for damping a relative movement between first and second masses (both not shown) according to an exemplary embodiment of the invention. The damper 1 includes a generator 2 driven by the mass movement and having a fixed stator 5 integrated in an inner housing wall of a first housing portion 4 of a hollow-cylindrical housing 3, and a cylindrical rotor 6 rotatable in relation thereto. The housing 3 is connected via a second housing portion 7 to a gear mechanism 8 which is coupled with the generator 2 and configured by way of example as planetary gear train. As described above, other types of gear mechanisms are, of course, also conceivable within the scope of the invention, in addition to the configuration of the gear mechanism 8 as planetary gear train.

The housing 3 is, for example, non-rotatably arranged to a vehicle structure, optionally via the intervention of elastomeric bearings (not shown). The attachment to the gear mechanism 8 is realized via bearing elements 9 in the form of rolling-contact bearings and via a ring-shaped section 10 of the gear mechanism 8 in axial surrounding relationship to the housing 3, with the section having some areas resting on the outer side of the housing 3 including its outer wall. As can be seen, the rotor 6 is dynamically coupled with the gear mechanism 8 via an axial pin 12 which is in fixed rotative engagement in a receiving space 11 of the rotor 6. This is explained in greater detail with reference to the principle of operation described hereinafter.

In the presence of a mass movement as a result of movements of a vehicle wheel 20 (cf. FIG. 2), a first gear element in the form of a ring gear 14, which is connected to a lever element 13 movable directly by the mass movement, is caused to rotate. The lever element 13 pivots perpendicular to the drawing plane in and out so that as a result of the fixed rotative connection of the lever element 13 with the ring gear 14, the ring gear 14 is caused to execute a rotational movement. The rotational movement is transmitted to the planet wheels 16 arranged on stationary webs 15 connected to the housing 3, and further to the sun wheel 17. The webs 15 are configured as part of a gear case 18 in partly surrounding relationship to the gear mechanism 8, with the gear case 18 optionally being capable to maintain tension upon the gear mechanism 8 and its components. The sun wheel 17 is connected in fixed rotative engagement with an end of the axial pin 12 which has another end which, as described, is connected to the rotor 6, i.e. rotational movements or torques of the sun wheel 17 are transmitted to the rotor 6. As the gear mechanism 8 is configured as planetary gear train, transmission ratios are possible, i.e. even small pivoting movements by the lever element 13 lead to relatively great rotational movements of the sun wheel 17 and further of the rotor 6 in relation to the stator 5 so that the efficiency of the damper 1 is significantly improved.

Thus, mechanical energy, generated as a vehicle body equipped with the electric damper 1 is compressed, can be recovered or converted into electrical energy, which electrical energy can be fed, for example via suitable rotor-side terminals 19, to an on-board electrical system of a motor vehicle. For that purpose, not shown windings are associated to the rotor 6. The terminals 19 may be configured in the form of or part of a commutator housing which supports the axial pin 12. Recovery or conversion of the mechanical energy is based on the principle of magnetic induction, i.e. a torque is generated in interaction with an excitation field through magnetic induction in opposition to the rotation of the rotor 6 and represents the damping force of the damper 1. Likewise, a stator-side current generation would be conceivable, when the stator includes windings instead of the rotor 6. By tailoring the application of current of the generator 2, damping characteristics of the damper 1 can be further adjusted.

Figure 2:
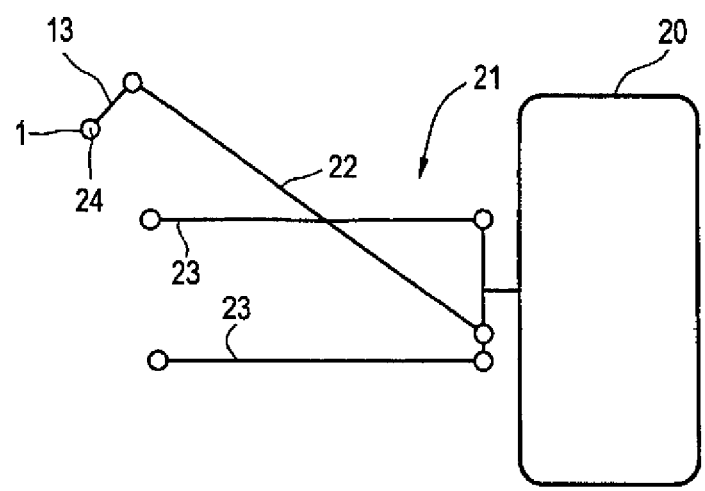

FIG. 2 shows a basic illustration of a possible installation scenario of an electric damper 1 in the area of a motor vehicle axis. Shown as part of a motor vehicle is a wheel 20 together with wheel carrier 21, to which a push rod 22 is arranged which is connected to the lever element 13. The lever element 13 is pivotally mounted about the rotation axis 24, with the damper 1 according to the invention being located in the rotation axis 24. It would also be conceivable to integrate the damper 1 directly into the rotary suspensions of at least one wishbone 23. When the vehicle wheel 20 moves in and out, the lever element 13 is moved via the push rod 22 and pivots about the rotation axis 24 to thereby operate the damper 1 according to the invention in the described manner.

As can be seen, the damper 1 according to the invention has a simple structure and constitutes in addition a compact componentry which can be used also in tight space conditions.

The invention claimed is:

1. An electric damper for damping a relative movement between first and second masses, comprising:
  a generator driven by a movement of the first and second masses and having a fixed stator and a rotor rotatable relative to the stator, said generator having a hollow-cylindrical housing with first and second housing portions, with the first housing portion receiving the rotor and the stator;
  a gear mechanism coupled to the generator, with the second housing portion of the generator being connected to the gear mechanism, said gear mechanism having a lifting member movable in response to the movement of the first and second masses, at least one first gear element directly connected to the lifting member and caused to rotate in response to a movement of the lifting member, and at least one second gear element dynamically coupled by direct or indirect transmission with the first gear element, with the second gear element being dynamically coupled to the rotor of the generator such that the rotor (6) is caused to rotate in relation to the stator, said gear mechanism being configured in one of three ways,
  a first way in which the gear mechanism is constructed as a planetary gear train with a ring gear, at least two planet wheels meshing with the ring gear, and a sun wheel meshing with the planet wheels, with the ring gear forming the first gear element, and with the sun wheel dynamically coupled with the rotor forming the second gear element,
  a second way in which the gear mechanism is configured as a strain wave gearing having a ring-shaped or cylinder-shaped flexible unit with an external toothing, a rigid unit forming the first gear element with an internal toothing in mesh with the external toothing of the flexible unit, and an oval rotary element which is arranged inside the flexible unit and interacts with the flexible unit such as to deform it and which is dynamically coupled with the rotor and forms the second gear element,
  a third way in which the gear mechanism is constructed as a cycloid gearing having a ring-shaped or cylinder-shaped unit which is connected with a cam disk which has an edge profiled with teeth and which in turn meshes with a fixed housing part which is profiled with teeth, with the ring-shaped or cylinder-shaped unit forming the first gear element, and with the second gear element, which engages the first gear element and is dynamically coupled with the rotor, being arranged on the cam disk; and a ring-shaped section associated to the gear mechanism for attachment of the gear mechanism to the housing, said ring-shaped section having at least one area in axial surrounding relationship to the housing and at least one area resting upon an outer side of the housing.

2. The electric damper of claim 1, wherein the second gear element is arranged in a bore of the cam disk.

3. The electric damper of claim 1, wherein the stator is arranged inside an inner wall of the housing.

4. The electric damper of claim 1, wherein the rotor has a cylindrical base shape.

5. The electric damper of claim 1, further comprising at least one bearing element connecting an outer side of the housing to the gear mechanism.

6. The electric damper of claim 5, wherein the bearing element is a roller bearing.

7. The electric damper of claim 1, wherein the second gear element has at least one axial pin which is connected in fixed rotative engagement with the rotor.

8. The electric damper of claim 7, wherein the at least one axial pin is connected in fixed rotative engagement with the rotor through engagement in a rotor-side axial mount.

9. The electric damper of claim 1, further comprising a flexible rolling-contact bearing arranged between the first and second gear elements, when the gear mechanism is configured as strain wave gearing.

10. The electric damper of claim 9, wherein the rolling-contact bearing is a roller bearing or a needle bearing.

\* \* \* \* \*